Figure 1:
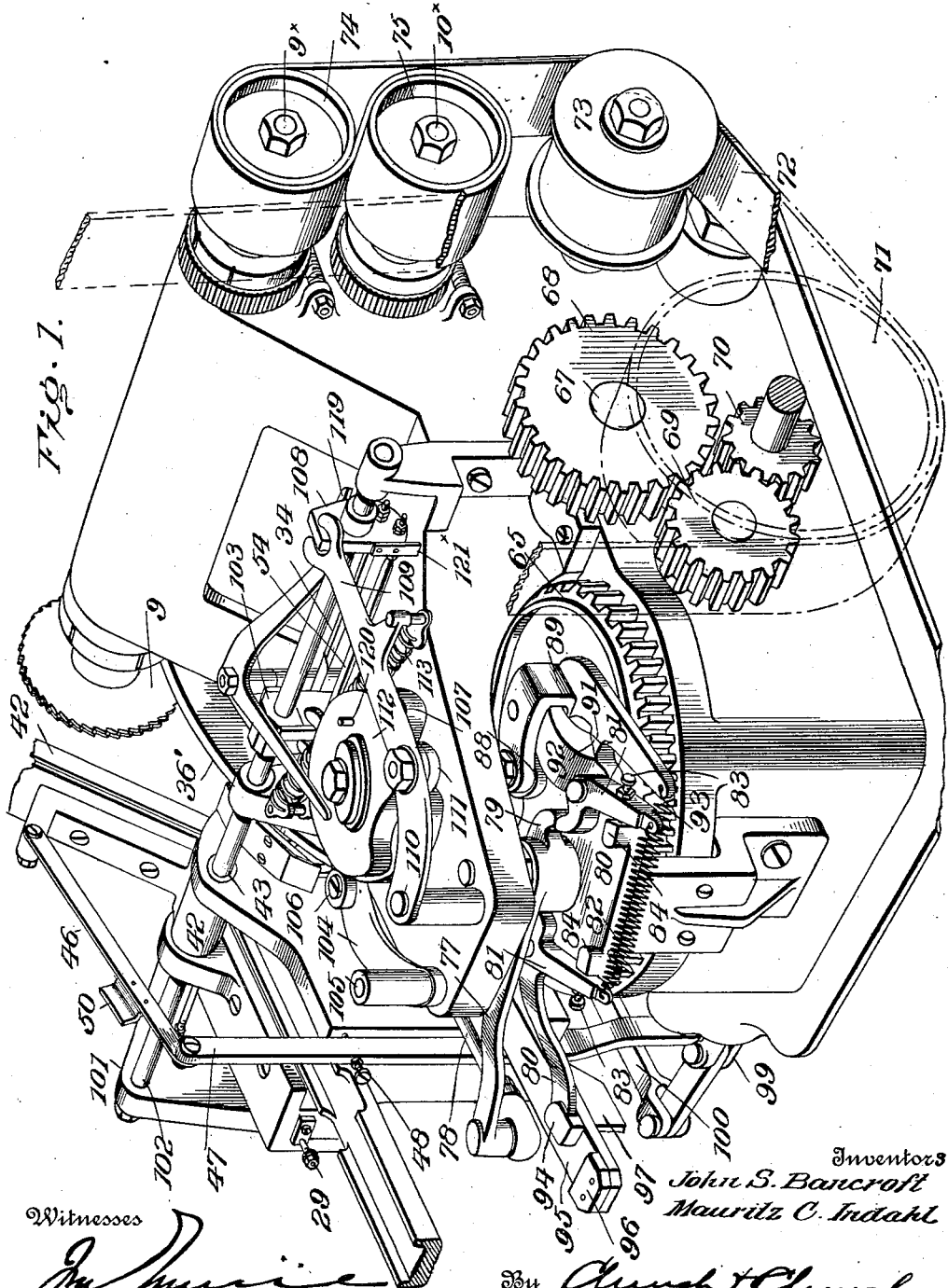

J. S. BANCROFT & M. C. INDAHL.
MATRIX MILLING MACHINE.
APPLICATION FILED FEB. 3, 1911.

1,008,304.

Patented Nov. 14, 1911.

12 SHEETS—SHEET 1.

Witnesses
Thomas Durant

Inventors
John S. Bancroft
Mauritz C. Indahl
By Church & Church
their Attorneys

J. S. BANCROFT & M. C. INDAHL.
MATRIX MILLING MACHINE.
APPLICATION FILED FEB. 3, 1911.

1,008,304.

Patented Nov. 14, 1911.
12 SHEETS—SHEET 2.

Witnesses
Thomas Durant

Inventors
John S. Bancroft
Mauritz C. Indahl
By Church & Church
Their Attorneys

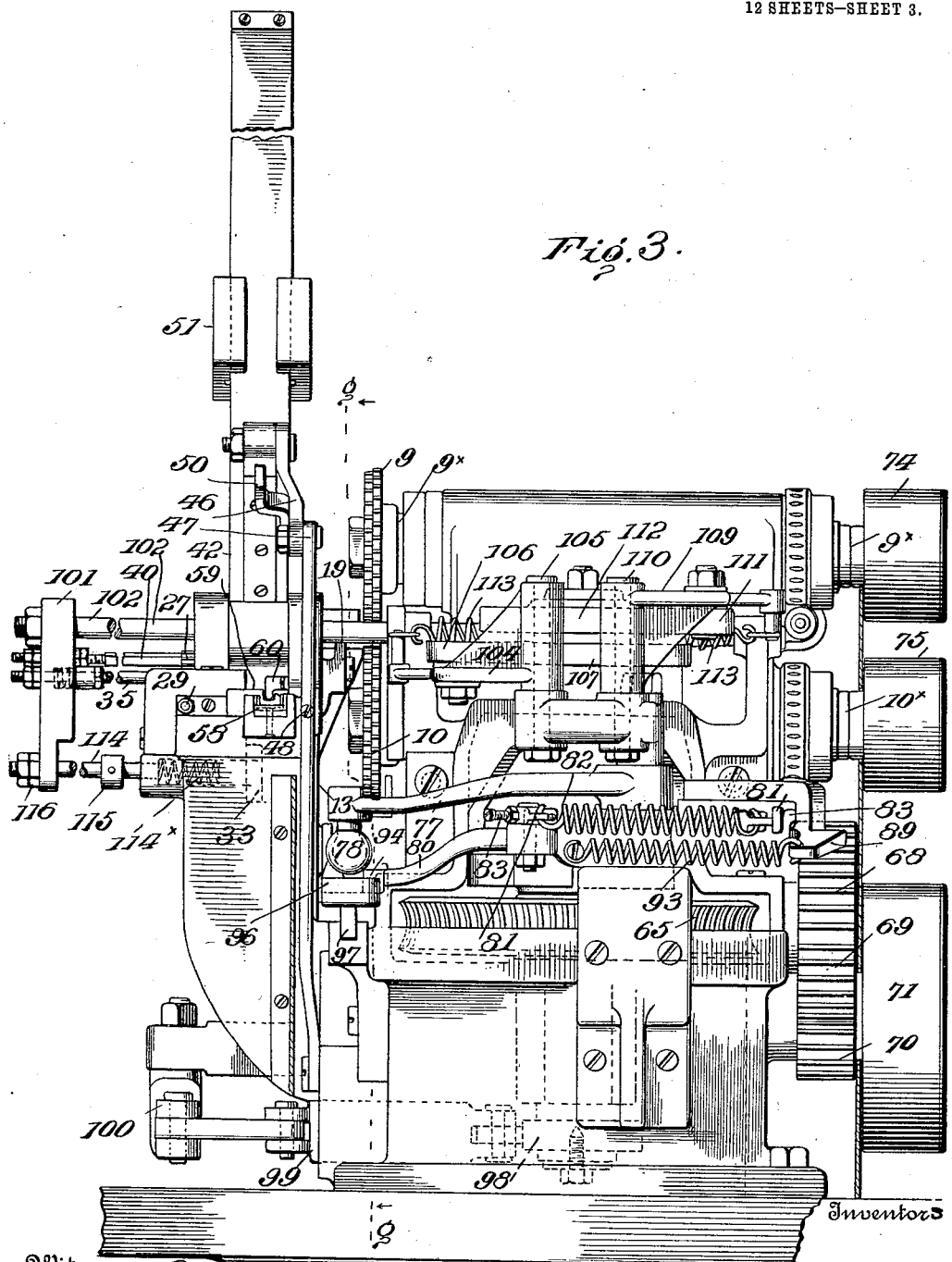

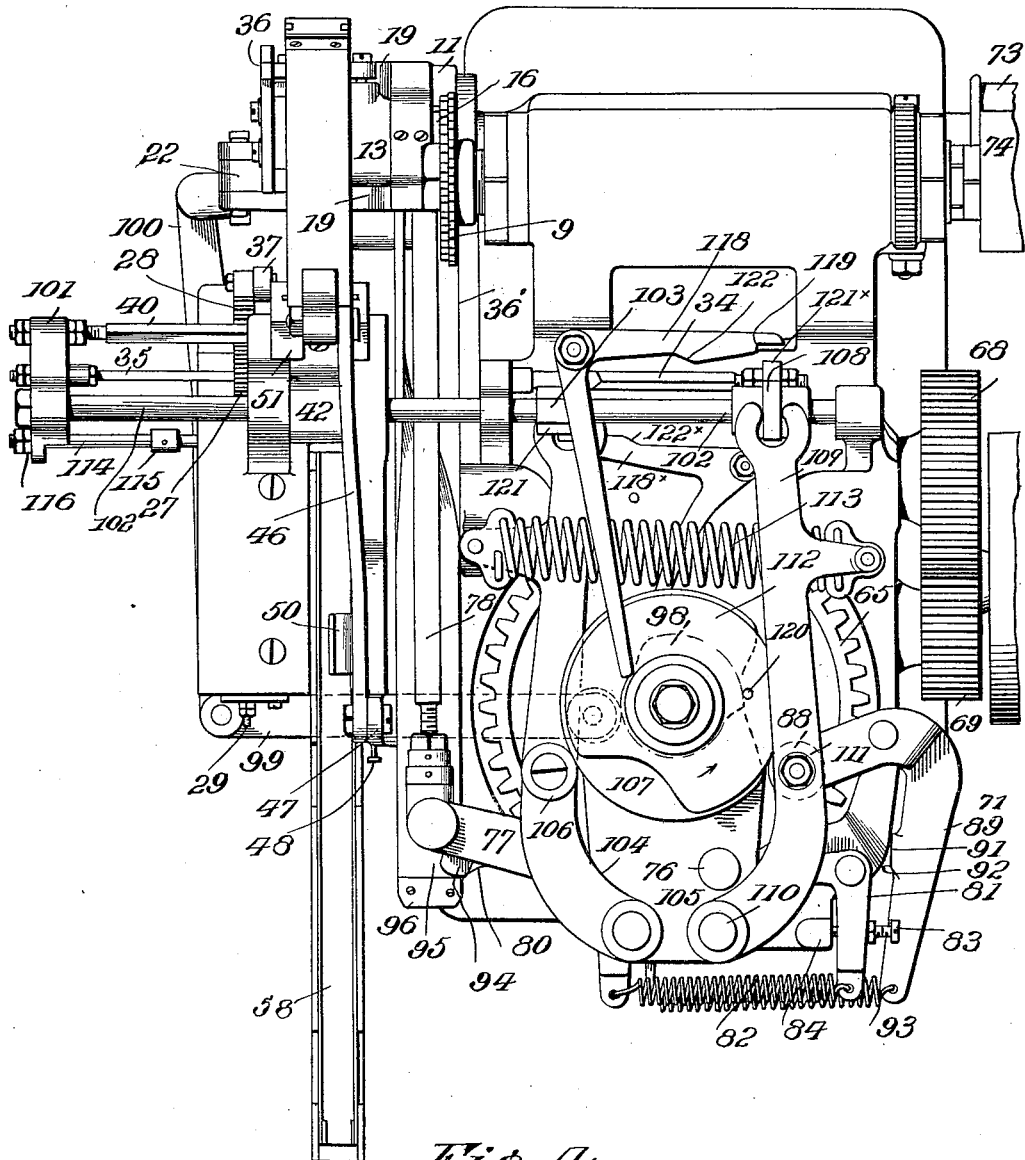

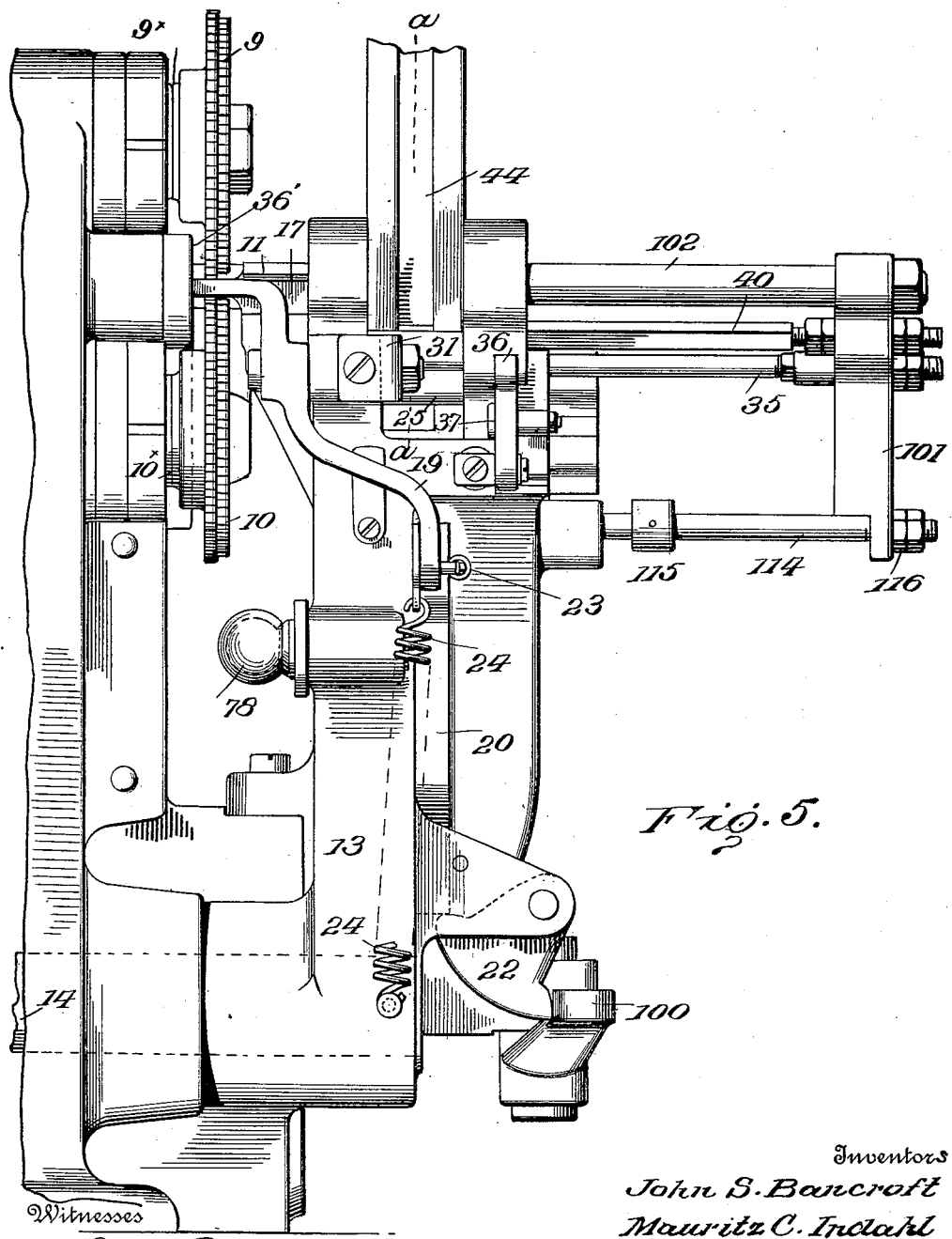

J. S. BANCROFT & M. C. INDAHL.
MATRIX MILLING MACHINE.
APPLICATION FILED FEB. 3, 1911.
1,008,304.
Patented Nov. 14, 1911.
12 SHEETS—SHEET 6.
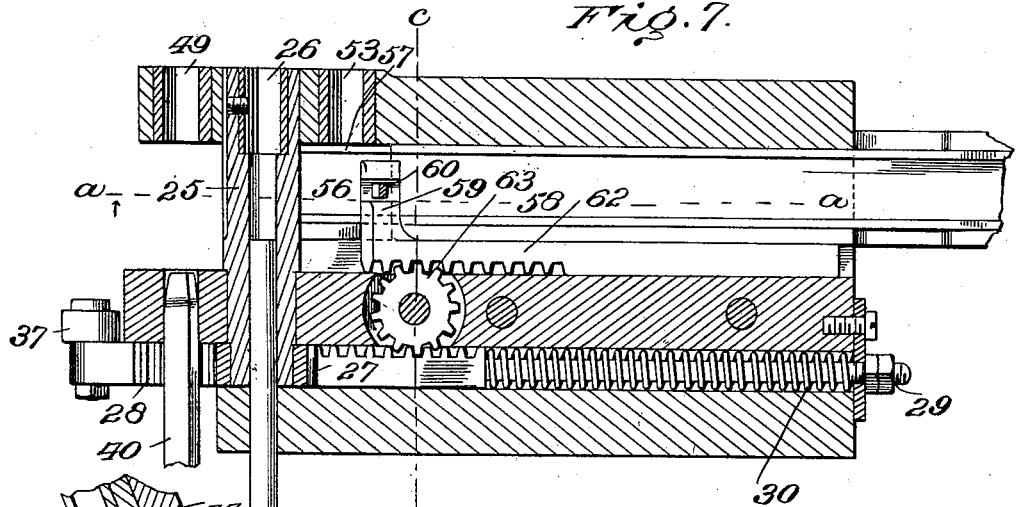
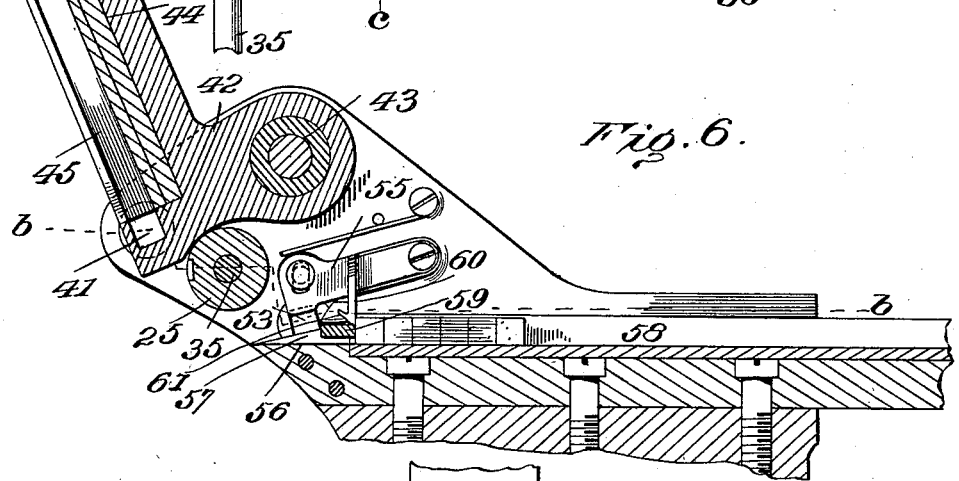
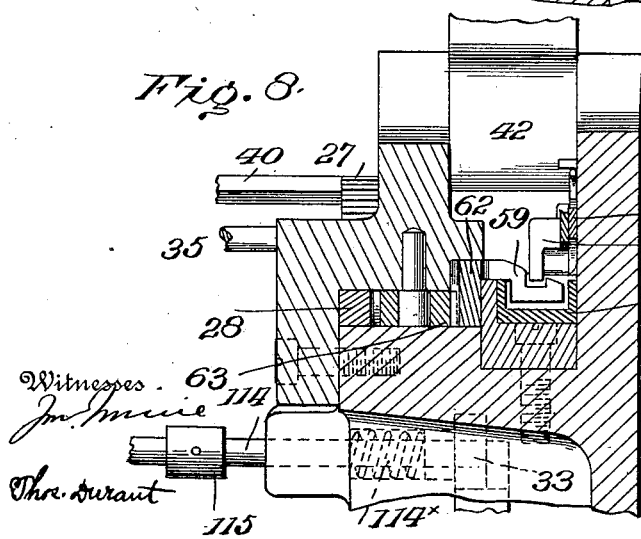
Inventors
John S. Bancroft
Mauritz C. Indahl J. S. BANCROFT & M. C. INDAHL.
MATRIX MILLING MACHINE.
APPLICATION FILED FEB. 3, 1911.
1,008,304.
Patented Nov. 14, 1911.
12 SHEETS—SHEET 7.
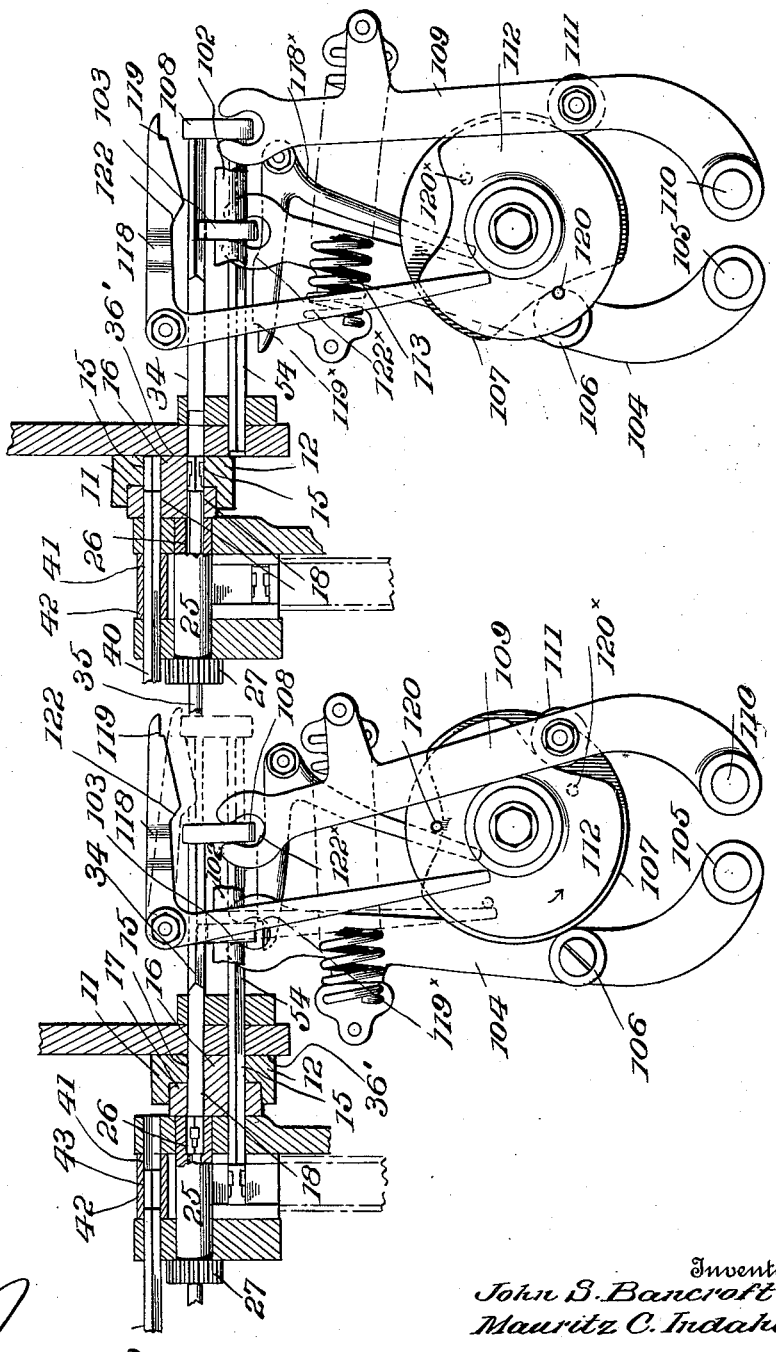

J. S. BANCROFT & M. C. INDAHL.
MATRIX MILLING MACHINE.
APPLICATION FILED FEB. 3, 1911.
1,008,304.
Patented Nov. 14, 1911.
12 SHEETS—SHEET 8.
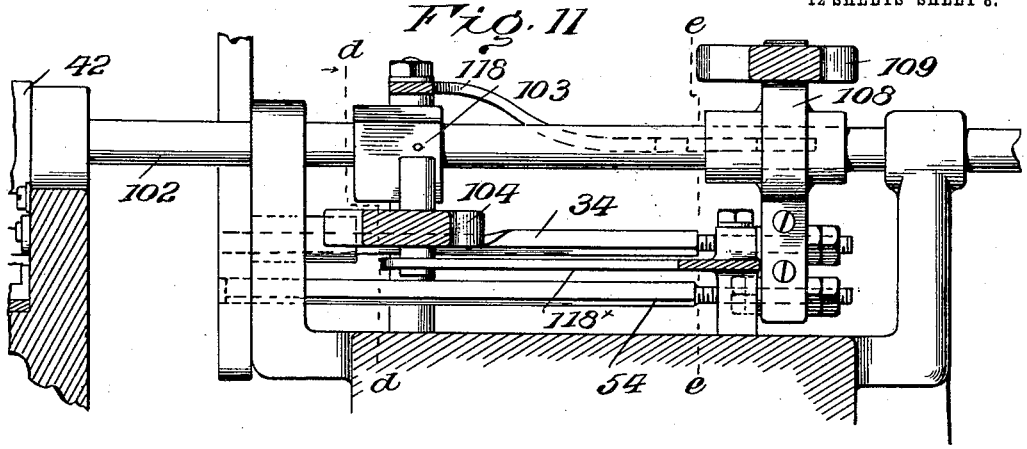
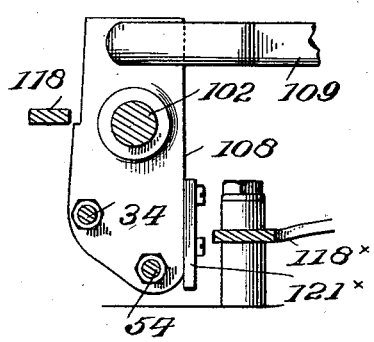
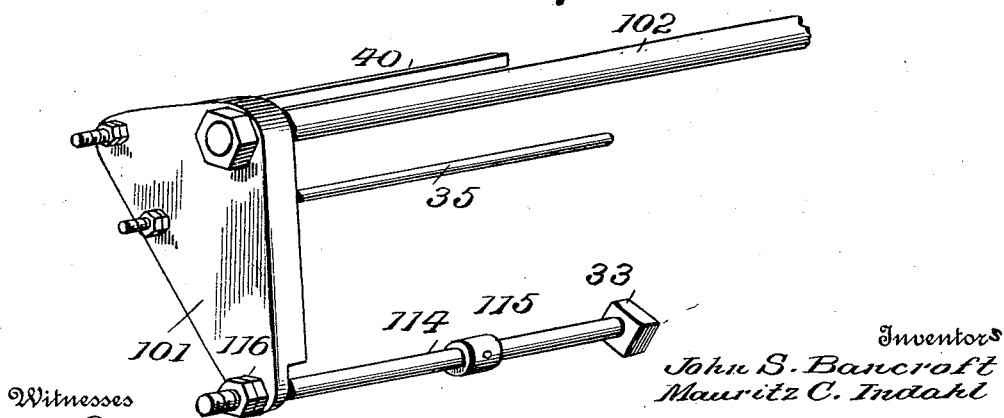
Witnesses
Inventors
John S. Bancroft
Mauritz C. Indahl
By Church & Church
their Attorneys

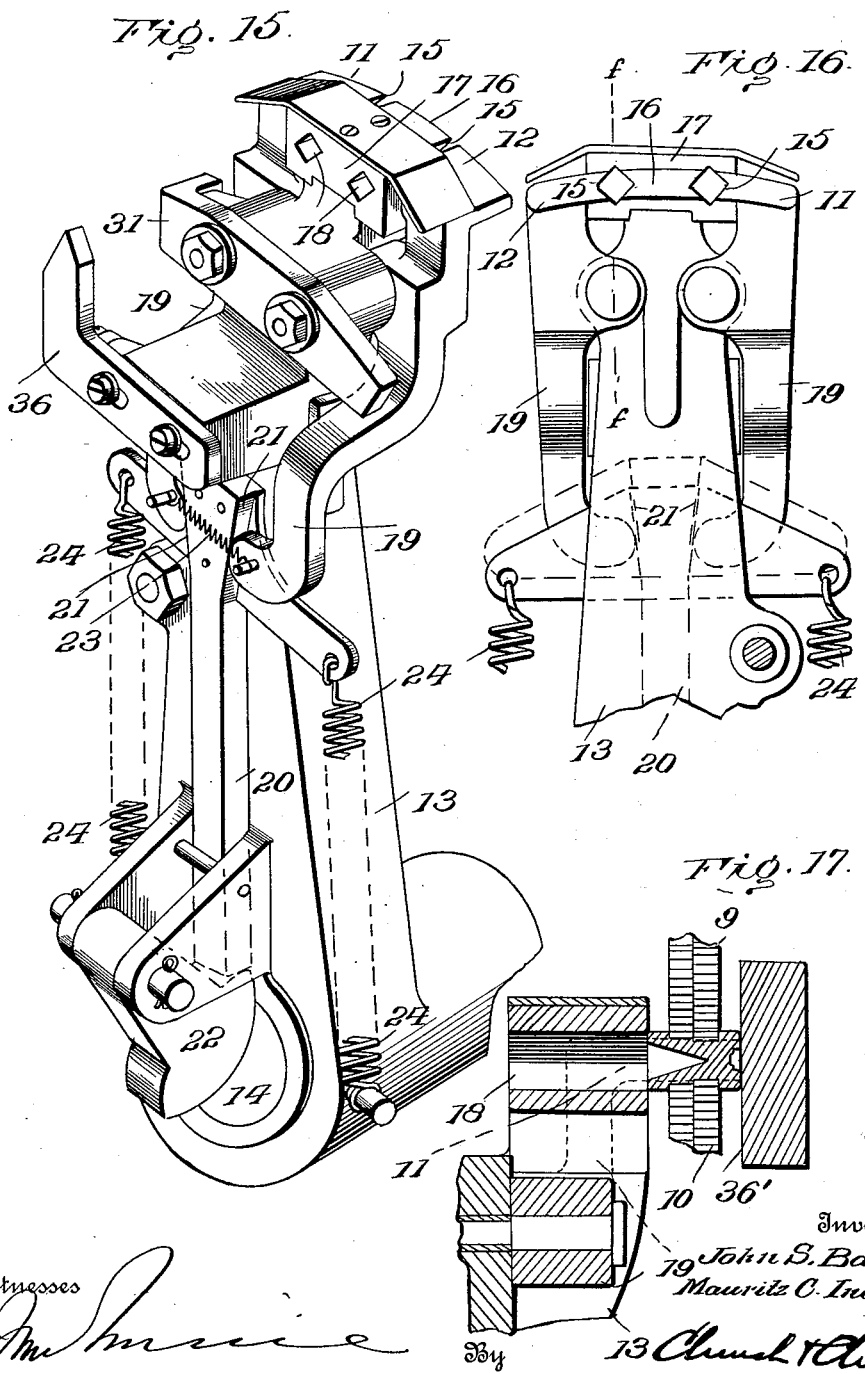

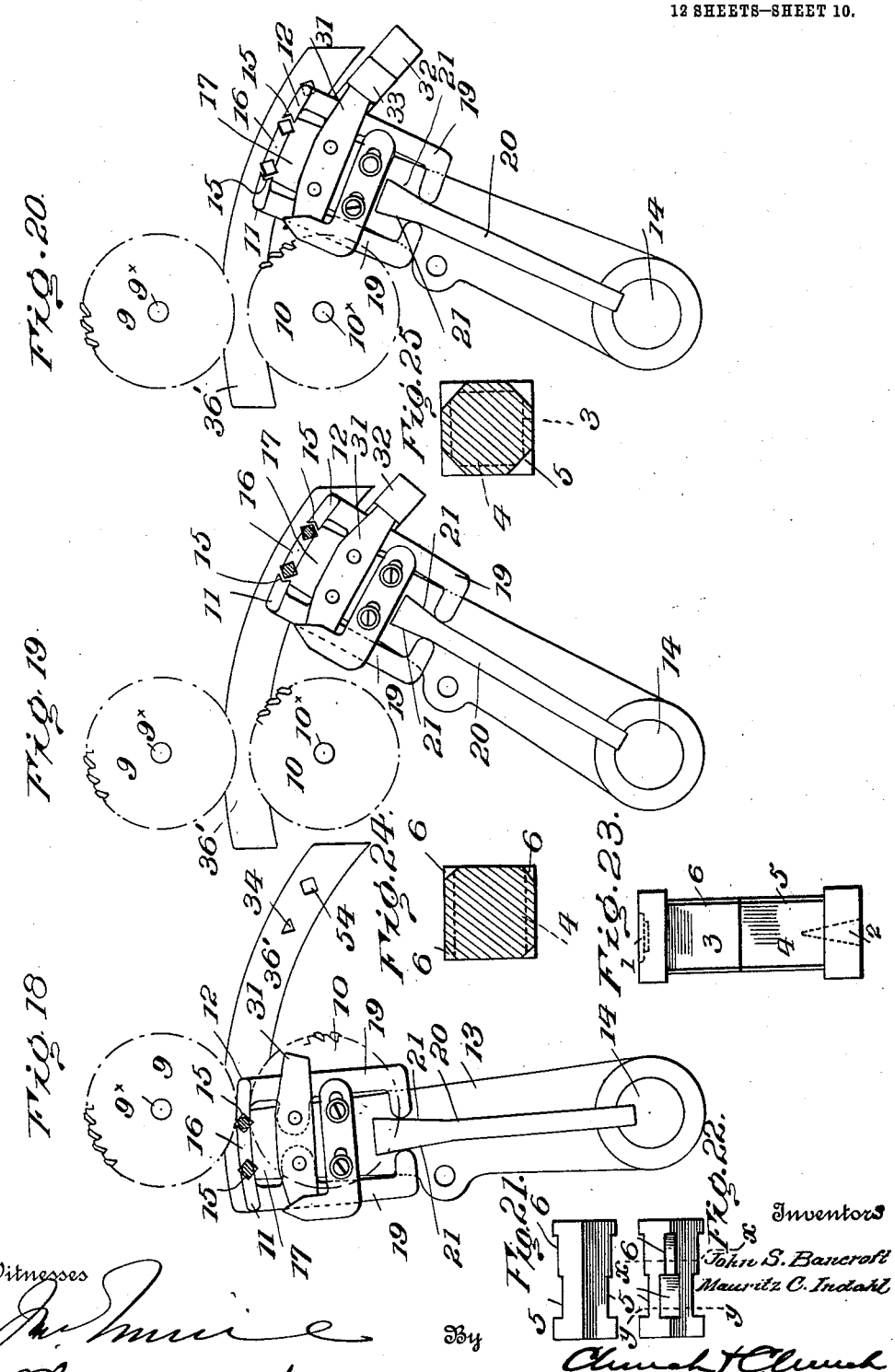

J. S. BANCROFT & M. C. INDAHL.
MATRIX MILLING MACHINE.
APPLICATION FILED FEB. 3, 1911.

1,008,304.

Patented Nov. 14, 1911.
12 SHEETS—SHEET 11.

J. S. BANCROFT & M. C. INDAHL.
MATRIX MILLING MACHINE.
APPLICATION FILED FEB. 3, 1911.
1,008,304.
Patented Nov. 14, 1911.
12 SHEETS—SHEET 12.
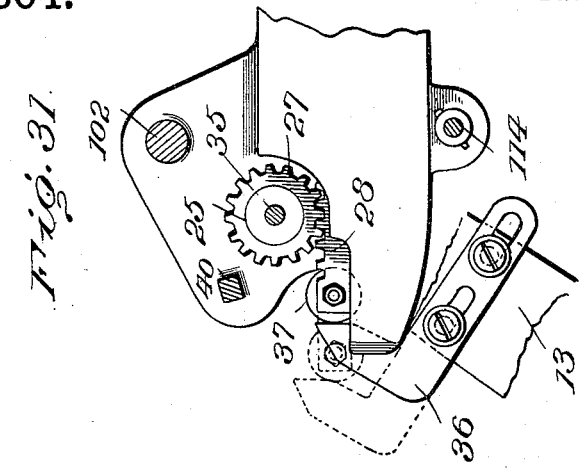
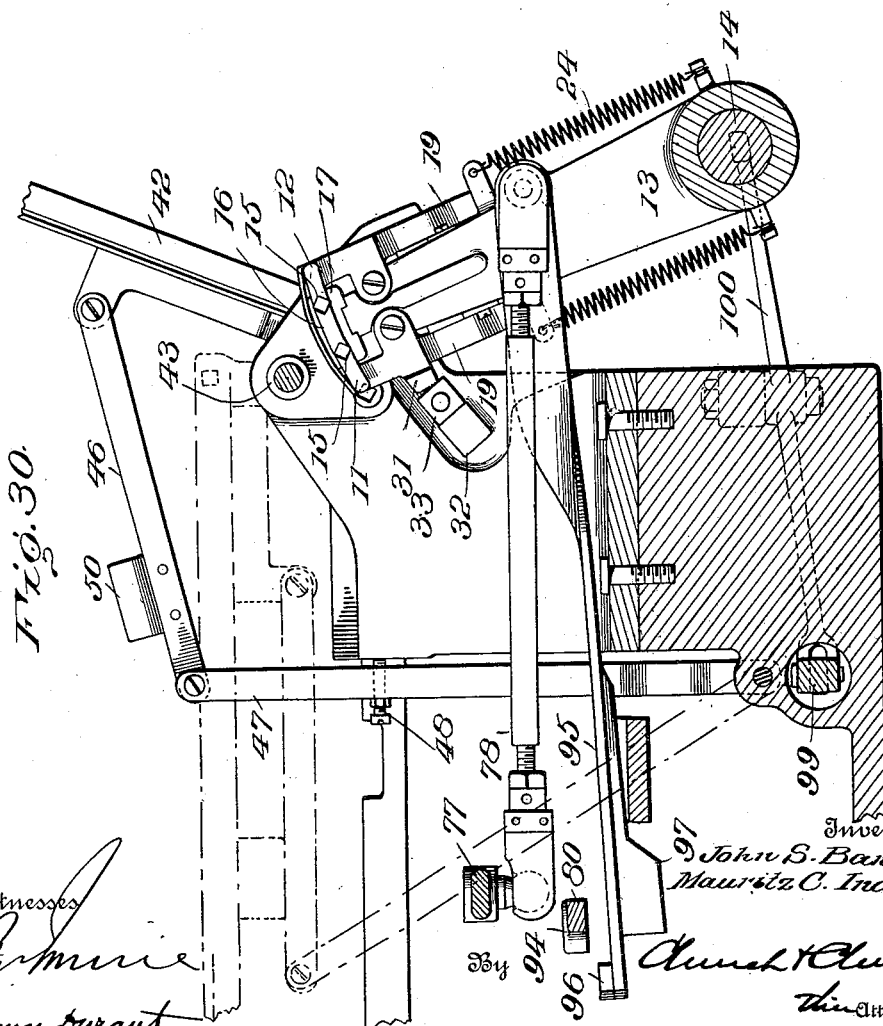

UNITED STATES PATENT OFFICE.

JOHN SELLERS BANCROFT AND MAURITZ C. INDAHL, OF PHILADELPHIA, PENNSYLVANIA, ASSIGNORS TO LANSTON MONOTYPE MACHINE COMPANY, OF PHILADELPHIA, PENNSYLVANIA, A CORPORATION OF VIRGINIA.

MATRIX-MILLING MACHINE.

1,008,304.  Specification of Letters Patent.  Patented Nov. 14, 1911.

Application filed February 3, 1911. Serial No. 606,399.

*To all whom it may concern:*

Be it known that we, JOHN SELLERS BANCROFT and MAURITZ C. INDAHL, citizens of the United States, residing at Philadelphia, in the county of Philadelphia and State of Pennsylvania, have invented certain new and useful Improvements in Matrix-Milling Machines; and we do hereby declare the following to be a full, clear, and exact description of the same, reference being had to the accompanying drawings, forming a part of this specification, and to the figures and letters of reference marked thereon.

This invention relates to the manufacture of what are known as cellular matrices, so-called because adapted for use in connection with the cellular die case of Patent No. 784,245, dated March 7, 1905. These matrices are parallelopiped blocks of metal containing a centering cavity in one end and a matrix cavity or a plain casting face at the opposite end, and are distinguished by a peripheral groove furnishing suspension shoulders. The grooving of the matrices is usually performed after the matrix and centering cavities have been driven and justified, and the sides and ends of the block dressed to standard form and dimensions, and is produced by an automatic milling machine, such as that disclosed in our Patent No. 980,903 dated January 10, 1911. As an incident to this milling process burs are thrown out at the ends of the cuts, and as these seriously interfere with the proper positioning of the matrices in the die case a subsequent operation is necessary for their removal. Owing to their location and the danger of mutilating the otherwise finished matrix the removal of the bur is performed by hand and requires considerable skill and attention upon the part of the operator, thereby considerably increasing the cost of manufacture.

Now, one object of the present invention is to diminish the cost of production by eliminating the manual burring operation, and this is accomplished by the introduction of a new step in the process, one which can be automatically performed and which operates to prevent the formation of the objectionable burs.

With this end in view the present invention consists and is embodied in a milling machine adapted to automatically withdraw successive matrices from a supply receptacle or galley, subject them to the action of milling cutters for the removal of the corners in the line of the side grooving cuts, thereby forming beveled surfaces inclined at an angle to the line of feed of the side grooving cutter or cutters, and subsequently delivering the matrices in column form to a receiving galley ready to be transported and delivered to the automatic side-grooving machine hereinbefore mentioned. The preliminary beveling of the corners thus performed prevents the throwing out of the bur by the side-grooving cutter. The preliminary beveling thus performed provides an emerging surface inclined inwardly toward the line of travel of the side grooving cutter, so that as the latter approaches the end of its cut the opposing wall rapidly diminishes in height and disappears at the line of emergence instead of presenting an emerging surface perpendicular to the feed of the cutter and liable to yield laterally and be thrown out as a bur as the cutter passes from the material.

Figure 2:
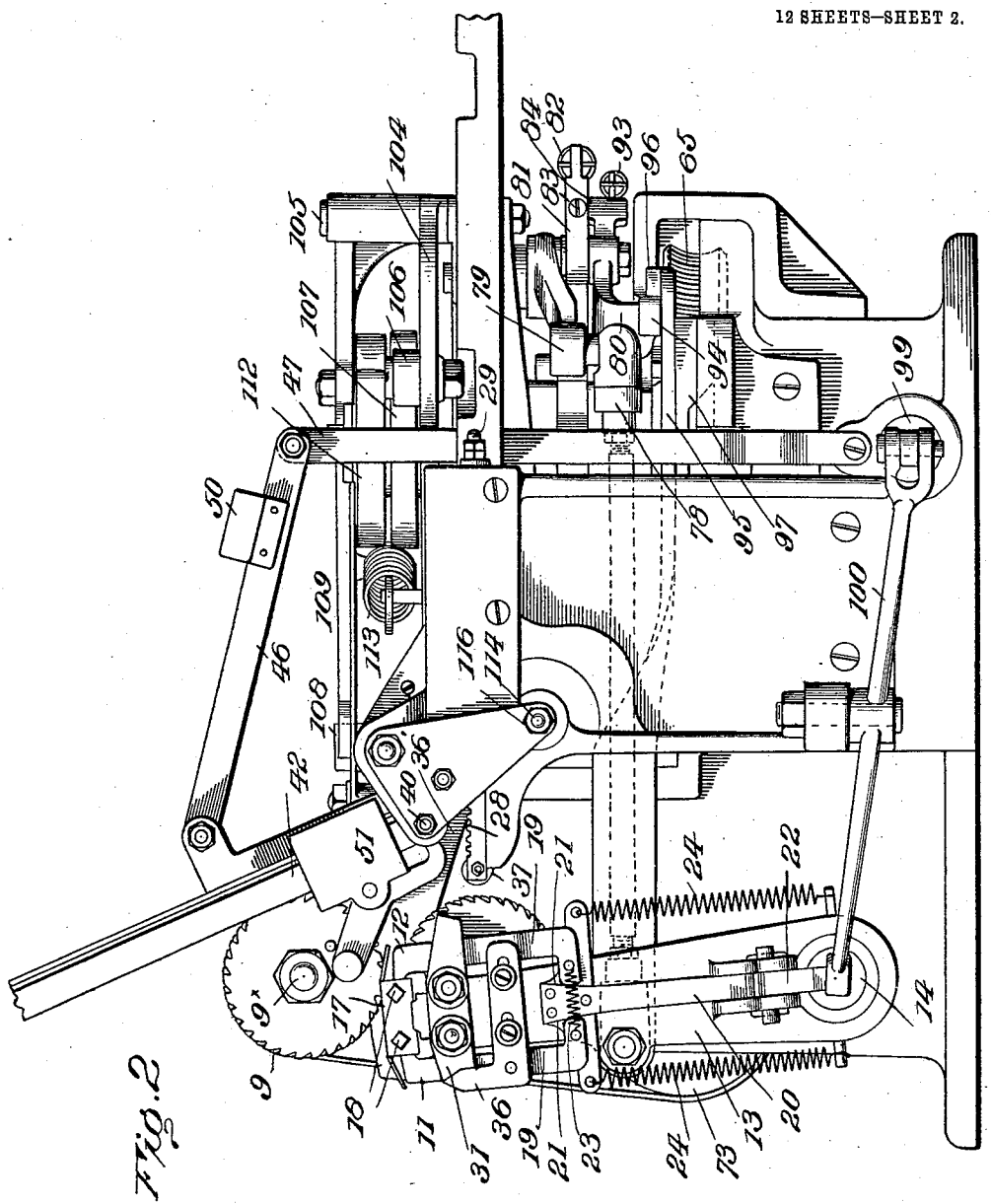

In the accompanying drawings illustrating a preferred form of embodiment of said invention,—Figure 1 is a rear perspective; Fig. 2 is a front elevation; Fig. 3 is a right end elevation; Fig. 4 is a top plan view of a completely organized machine embodying the invention; Fig. 5 is a left side elevation on an enlarged scale of the cutting and matrix transporting and holding devices; Fig. 6 is a partial vertical section on the line $a$—$a$, Fig. 5; Fig. 7 is a horizontal section of Fig. 6 taken on the line $b$—$b$; Fig. 8 is a transverse vertical section on line $c$—$c$ of Fig. 6; Fig. 9 is a top plan view of the ejector or pusher actuating devices; Fig. 10 is a similar view with the pushers in the opposite extreme position; Fig. 11 is a rear elevation, partly in section, of the pusher actuating devices; Fig. 12 is a transverse vertical section on the line $d$—$d$ of Fig. 11; Fig. 13 is a transverse vertical section on line $e$—$e$, Fig. 11; Fig. 14 is a perspective of the pusher carrier or head with gag block attached; Fig. 15 is a view in perspective of the matrix carrier; Fig. 16 is a front elevation of the upper portion of the matrix carrier; Fig. 17 is a sectional view of the matrix carrier on line $f$—$f$, Fig. 16, together with portions of the end gage and milling cutters; Fig. 18 is a diagrammatic view showing the matrix carrier in extreme left position relatively to the cutters; Fig. 19 is a similar view with the matrix carrier in extreme right position; Fig. 20 is a similar view with the matrix carrier in intermediate position against the gag block; Fig. 21 is a side elevation of the matrix showing the effect of its first passage between the cutters; Fig. 22 is a similar view illustrating the effect of the final passage between the cutters; Fig. 23 is a side elevation of the finished matrix; Fig. 24 is a section on line $x$—$x$, Fig. 22; Fig. 25 is a section on line $y$—$y$, Fig. 22; Fig. 26 is a top plan view of the matrix carrier actuating mechanism; Fig. 27 is a detail view showing in perspective a portion of one of the carrier actuating levers or members; Fig. 28 is a detail view in perspective of the head of the other carrier actuating lever or member; Fig. 29 is a perspective view of the compensating lever; Fig. 30 is a vertical section on line $g$—$g$, Fig. 3; Fig. 31 is a detail view showing the means for actuating the rotator from the carrier.

Like numerals designate corresponding parts in the several figures.

The machine as a whole embraces two correlated but distinct mechanisms, the one including the operating devices or those actuating directly upon the matrix to change its form or position, and the other including the actuating devices for producing and controlling the motions of the operating devices. Of the operating devices the principal members are the cutters; the carrier; the rotator; the feeder; and the discharger; said elements coöperating to transfer the matrices, one at a time and in succession, from a supply galley or receptacle to the carrier; position and grip the matrix with its opposite edges exposed; pass the matrix between the cutters for the removal of the exposed edges where they project into the paths of the cutters; give the matrix a one-quarter turn about its longitudinal axis, restore it to the carrier, and again pass the matrix between the cutters; and finally, discharge the matrix into a receiving galley in condition to be transported to the automatic side grooving mechanism,—all of which operations are automatically performed through the agency of the actuating devices.

As illustrated in Fig. 23, the finished matrix contains in addition to its casting and centering cavities 1 and 2, two sets of intersecting side grooves, 3, 4, of substantially the same depth, but differing in width. The grooves of each set are parallel and intersect those of the other set at right angles, but, one set being wider than the other, portions of each of the wider grooves intersect the side faces of the matrix containing the narrower groove. The side grooving is preferably performed by the automatic machine of Patent No. 980,903, but in the absence of a preliminary treatment, such as is performed by the present machine, burs or fins will be thrown out by the milling cutters as they emerge from the ends of the grooves. This is due to the fact that the outer wall at the end of the cut being perpendicular to the line of the cut and unsupported yields to the advance of the cutters and is bent outward and downward as the cutter emerges from the blank. To prevent this action the corners of the matrix in line with the side grooves are preliminarily cut away at an angle to the line of movement of the side grooving cutter, thereby forming beveled surfaces at an angle to the feed of the cutter so that as the latter approaches the end of the cut the wall in front will be reduced, both in height and thickness, and finally removed without throwing out the objectionable bur. In the present instance, the machine is constructed to bevel the corners in planes at an angle of about 45° to the intersecting side grooves, and inasmuch as each groove 4 intersects the narrower groove 3 at a point within the body corresponding to the depths of said grooves, while the laterally extended portion of the wider grooves 4 emerge at the surface, the cuts at these two points of intersection must vary in depth in order that the bevels may reach, or, preferably, extend slightly within the points of intersection, as illustrated in Figs. 21, 22, 24 and 25, wherein the bevel 5 corresponds with the width of the narrower groove 3 and the bevel 6 with the lateral extension of wider groove 4. Preferably the bevels 5, 6 are so proportioned relatively to the depths of the intersecting grooves 3 and 4 as that the cutters traversing in paths indicated by dotted lines in Figs. 24 and 25 shall intersect said beveled surfaces within the angle of intersection of the side grooves, to produce beveled corners 8 at the ends of the cuts, thereby not alone insuring an absence of interfering fins, but affording accommodation for irregularities in the angle at the junction of the fingers with the suspension bars of the die case.

The beveling cutters are represented by two milling cutters 9, 10, each secured to one of two shafts $9^\times$, $10^\times$ supported in adjustable bearings on the frame, whereby the interval between the proximate edges of the two cutters can be varied as required. Each cutter is formed or provided with two cylindrical cutting sections differing in diameter to correspond with the relative difference in the depth of the produced cuts forming bevels 5, 6, and the cutters are so set or adjusted that the space between them shall correspond with the interval between the bevels 5, 6 on diametrically opposite edges of the matrix. It is obvious that with the cutters so arranged, it is possible to produce bevels on the four corners of the matrices by passing the latter sidewise between the cutters with diametrically opposite edges projecting equally on opposite sides of the path of movement of the matrix and intersecting that of one of the cutters, then turning the matrix about its longitudinal axis to present the remaining two edges in position, and again passing the matrix between the cutters; but the extreme degree of accuracy required of the product renders necessary certain precautionary measures, to insure the proper location and formation of the cuts during and by the passing of the matrix between the cutters. These operations are performed through the agency of the carrier and associated rotator and gaging members as will next be described.

In the preferred form of embodiment illustrated, the carrier is provided with two sets of blank holders in the form of jaws 11, 12 mounted in tandem upon a support or carrier, the latter represented by radius bar 13, secured to a shaft 14 supported in bearings on the frame. The axes of shafts $9^x$, $10^x$ and 14 are parallel and disposed in a single plane, and the jaws are somewhat thinner than the interval between cutters 9, 10, and so located with respect thereto that when the carrier is reciprocated said jaws will clear the cutters in passing between the latter. The proximate faces of each pair of jaws are furnished with angular grooves or seats 15 parallel with the axis of shaft 14 in which grooves the matrix is received and gripped during its passage between the cutters, said seats being so proportioned and arranged that when a matrix is inserted and clamped therein the diametrically opposite edges thereof will project equally on opposite sides of the jaws and extend the proper distance beyond the latter to effect the desired removal of metal to form the bevels when the jaws are reciprocated and caused to traverse between the cutters. The inner jaws of the two pairs are conveniently formed by an extension 16 of a block 17, the latter detachably secured to the radius bar 13 and provided with two rectangular openings 18, each registering with the groove or seat 15 of the fixed jaw adjacent thereto, while the outer or movable jaws are each carried by one of two levers 19, pivoted upon radius bar 13.

Supported and guided to reciprocate longitudinally of radius bar 13 is an actuating member or bar 20 provided with inclined surfaces 21 intermediate the power ends of levers 19, the lower end of said bar engaging one arm of a bell crank lever 22 supported in brackets on radius bar 13. A spring 23 connecting the power ends of levers 19 serves to maintain the latter in engagement with bar 20 and to open the jaws, while springs 24 connected to said bar 20 serves to advance the latter in a direction to close the jaws. As thus arranged the jaws are normally held closed in gripping position through the action of springs 24 on wedges or inclines 21, and the retraction of the jaws to open the latter for the reception or discharge of a matrix is accomplished by pressure on lever 22.

The rotator is designed to receive the matrix from one pair of jaws after having been passed between the cutters, give it a quarter turn and then return it to the other pair of jaws preliminary to a second passage between the cutters, so that the four corners or edges of the matrix will be beveled, and the matrix transferred from the receiving to the discharging jaws, to the end that the insertion of an untreated matrix and the removal of a finished matrix may be performed during each reciprocation of the carrier, as will presently appear. In the present instance the rotator takes the form of a spindle 25 supported in bearing on the frame at one side by the path traversed by the jaws of the matrix carrier and provided with an angular socket 26 registering with either opening 18 in the carrier when the latter is arrested in position to bring the corresponding jaws opposite said socket. Spindle 25 is provided with a pinion 27, engaging a rack 28 movable longitudinally in bearings on the frame, and to said rack is coupled an adjustable stop 29 and an impelling spring 30, the latter operating to retract the rotator and acting in conjunction with said stop, to normally hold socket 26 in position to register with the jaws when brought opposite thereto.

Upon the return of the carrier after having subjected the contained matrices to the action of the cutters, it is first arrested with jaws 12 in register with the rotator and subsequently with jaws 11 in register therewith, and while either pair of jaws is in alinement with the rotator pressure is applied to lever 22 to temporarily open both pairs of jaws. The positioning of the carrier is effected by bringing an adjustable gaging member 31 on the carrier into contact with an abutment 32 on the frame, whereby jaws 12 are brought into register with the rotator, as indicated in Fig. 9. From this position the carrier is next advanced slightly and a gag block 33 interposed between said gaging members 31 and abutment 32 whereupon the carrier is retracted to establish contact with said gag block, thus bringing jaws 11 into register with the rotator as indicated in Fig. 10. While the carrier is in engagement with abutment 32 a pusher 34 is advanced to transfer the matrix in jaws 12 to the rotator the angular position of which is determined by an adjustable arm 36 on the carrier engaging roller 37 on rack 28, and while the carrier is in contact with the gag block a pusher 35 is advanced through the rotator to discharge the contained matrix into jaws 11, the longitudinal position of the matrix being determined by the contact of one end with a gaging surface 36'. During the latter part of the return movement adjustable arm 36 on the carrier engages a roller 37 on rack 28 to retract the latter against the pressure of its impelling spring, thereby turning the rotator for the reception of the matrix in jaws 12, so that, upon the next forward movement of the carrier preliminary to its engagement with gag block 33, motor spring 30, acting through rack 28 and pinion 27, will effect a quarter turn of the rotator and contained matrix prior to the discharge of the latter into jaws 11. It may here be observed that owing to the presence of the matrix and centering cavities in the ends of the matrices it is desirable in order to avoid mutilation, that the pushers acting upon the ends of the matrices should be dimensioned and shaped to engage the ends or faces at or near the margins thereof, to which end the pushers are usually rectangular or circular in cross section with the exception of the one which effects the transfer from jaws 11 to the rotator. This one, 34, emerges from the gaging surface 36' and its transverse section is triangular or less than that of the matrix, in order that a portion of the gaging surface may be exposed in the line of movement of the matrix as the latter is transferred from the rotator to the jaws through the action of the pusher 35, and at the same time marginal contact with the end of the matrix be insured.

The blanks are delivered by the feeder to jaws 12 of the carrier while the latter is engaging gag block 33 and coincidentally with the transfer of the partially finished matrix from the rotator to jaws 11. The feeder is represented by a pusher 40 guided to reciprocate through a channel 41 in a frame 42, the latter pivotally supported on a hollow shaft 43. An arm or extension of frame 42 is provided with a groove or way 44 for the reception of a removable galley or matrix holder 45, the latter standing perpendicular to and with its lower end opening into feed channel 41. Frame 42 is supported in the inclined position shown by a link 46 connected at one end to said frame and at the opposite end to a lever 47, the latter pivoted at its lower end to the main frame and carrying an adjusting screw 48 contacting with a seat on the main frame for varying the angular position of frame 42 so as to bring channel 41 into register with a guide opening 49 in the main frame, said opening 49 in turn registering with jaws 12 when the carrier is in the indicated position. The arrangement described is specially devised to permit the galley carrying arm of frame 42 to be swung down into the horizontal position indicated by dotted lines in Fig. 30, to which end the link 46 is provided with an offset 50 to receive and sustain the frame when folded back. A weight 51 guided to move longitudinally on the arm of frame 42 and provided with a projection within the galley assists in advancing the column of matrices toward channel 41 in which the lowermost matrix rests until removed therefrom by the advance of pusher 40.

When the carrier is in contact with abutment 32 and jaws 11 register with a guide 53, the finished matrix is discharged from said jaws through said guide by means of a pusher 54. As the matrix emerges from guide 53 it displaces a spring actuated latch 55 partially closing the discharge end of said channel, and is deposited in a transverse channel 56 the floor whereof is displaced laterally of that of guide 53 to form a retaining shoulder 57 for preventing the return of the matrix when discharged by pusher 54. Channel 56 communicates at one side with the entrance to a removable galley 58 into which the matrix is advanced by a pusher 59, the matrix thus advanced being retained in the advanced position by a detent 60, the latter pivoted to the frame and provided with an incline 61 by which it is displaced by the advancing matrix. Pusher 59 is carried by a rack bar 62 movable in guides and engaging a pinion 63, the latter in turn engaged by rack teeth on one edge of the rotator rack 28, whereby as said rack 28 is advanced by the carrier to turn the rotator, pusher 59 will be advanced to the left, Fig. 6, beyond guide 53, and after the matrix has been deposited in front of said pusher the advance of rack 28 under the action of spring 30, coincident with the advance of the carrier toward the cutters, will move the pusher to the right and advance the matrix beyond detent 60 and deposit it in galley 58. The matrices are delivered into galley 58 in the same relative position they occupied in galley 45 and in condition to be fed directly to the side grooving machine.

A brief résumé of the operations to be performed will assist in understanding the actuating devices next to be described and which may, if desired, be replaced in whole or in part. Assuming the cycle to begin with the insertion of a matrix into the carrier. At this stage the carrier is held in contact with the gag block, the rotator contains the partially finished matrix of the preceding cycle, and both pairs of jaws are open and empty, being so held by pressure applied to lever 22. Pushers 40 and 35 are advanced, the one to transfer a matrix from the supply galley to jaws 11, and the other to transfer the matrix from the rotator to jaws 12. Pressure is withdrawn from lever 22, to permit the jaws to close upon and grasp the contained matrices, whereupon the carrier is advanced between the cutters. The gag block is withdrawn from the path of the carrier so that upon the return of the latter it will engage and be arrested by abutment 32 with jaws 12 opposite the entrance to the receiving galley, and jaws 11 opposite the rotator, which latter, through the engagement of its operating rack by the carrier, has now been turned a quarter, and at the same time the pusher for the receiving galley has been retracted. Pressure being now applied to lever 22, to open the jaws, pushers 34 and 54 are advanced, the one operating to discharge the partially completed matrix from jaws 11 into the rotator, and the other to discharge the completed matrix from jaws 12 to the receiving galley. Upon the withdrawal of the last named pushers the now empty carrier with its jaws still open is advanced sufficiently to permit the gag block to be projected and after said projection the carrier is retracted and brought to first position with jaws 11 in register with the feeder and jaws 12 with the rotator. During this advance of the carrier the rotator is turned by its motor and the receiving galley pusher is advanced to remove the last finished matrix.

The various driven members, save the cutters, receive motion from a cam shaft 64 carrying a worm wheel 65 gearing with a worm 66 attached to a shaft 67. The last named shaft is provided with a gear 68 connected through an idler 69 with a pinion 70 on a driver, such as pulley 71. A belt 72 extending around a main driving pulley (not shown) passes partially around pulley 71, thence around an idler 73, above and around a pulley 74 on the upper cutter shaft, down and around the pulley 75 of the lower cutter shaft, and thence back to the main driving pulley, as indicated in Fig. 1. Supported upon a pivot pin 76 on the frame is a transmitting member in the form of lever 77 the outer end whereof is connected through an adjustable link 78 with the radius arm 13 of the carrier. The transmitting member is coupled with a driving member through opposing yielding connections, and to this end lever 77 is provided with two arms 79 symmetrically disposed on opposite sides of the pivot. Upon pin 76 is also pivoted the driving member represented by yoke 80, bearing two yielding contacts each engaging one of the arms 79 of lever 77, said contacts in the present instance, being represented by two bell crank levers 81 pivotally supported and arranged in relatively reversed position upon yoke 80, each of said levers having one arm engaging the opposed arm 79, while the other arms are coupled by a spring 82, the latter operating to maintain said arms and levers in contact under yieldable pressure. Each lever 81 carries an adjusting screw 83 in position to engage a bearing 84 on yoke 80. As thus arranged transmitting member 77 is held normally in a median position with relation to the driving member or yoke 80 through the pressure of spring 82 applied equally on opposite sides of the center of oscillation, but is capable of independent movement in either direction in opposition to the pressure of said spring. Cam shaft 64 carries two opposed cams 85, 86 in different planes, the first engaging a roller 87 on one side the axis of oscillation of yoke 80 and the other engaging a roller 88 located on the opposite side of said axis. The roller 88 is carried by a lever 89 pivoted upon the yoke, as at 90, and provided with limiting stops 91 intermediate opposing abutments 92 carried by the yoke. A spring 93 interposed between lever 89 and yoke 80 serves to project roller 88 toward its cam and thereby prevent lost motion by retaining contact between the opposing rollers 87 and 88, and their respective cams. The cams are so formed and correlated as to produce the described forward and back movements of the carrier and the dwells necessary for the transfer of the matrices.

The cutters are preferably arranged to rotate in relatively opposite directions with their proximate edges moving in the direction of the advance of the carrier, hence they manifest a tendency to draw the carrier forward more rapidly than indicated by the opposed cams 85, 86, such movement being permitted by the presence of the yielding coupling between yoke 80 and actuating lever 77. To overcome this undesirable acceleration in the feed movement of the carrier means are provided for supplementing the elastic with a rigid connection between yoke 80 and the carrier during the traverse of the jaws between the cutters. With this end in view yoke 80 is formed or provided with an arm or extension 94 and to the carrier is pivotally connected a link 95 equipped with an abutment 96 adapted to be interposed in the path of said extension 94 during the passage of the matrices between the cutters. When the carrier is in its retracted position, Fig. 30, link 95 is supported upon the frame with its abutment 96 removed from the path of extension, and to elevate it into said path during the advance of the carrier and as the jaws approach the cutters, said link 95 is furnished with a cam or incline 97 which engaging the frame elevates the link to bring its abutment 96 in rear and in the path of extension 94 of yoke 80, as in Fig. 26, thus positively connecting the yoke and carrier and preventing the latter from advancing faster or to a greater extent than indicated by carrier cam 85.

The movements of bell crank lever 22 to open and close the jaws of the carrier, are derived from a cam 98 on shaft 64 acting through bar 99 and lever 100 (Figs. 2, 3 and 4) the latter engaging the arm of bell crank 22 in the axis of oscillation of the carrier.

Inasmuch as pushers 35 and 40 are arranged to act in unison they are adjustably secured to a head 101, Fig. 14, carried by a rod 102, the latter supported to reciprocate longitudinally in bearings on the frame, one of said bearings being furnished by the hollow shaft 43 constituting the pivot of the supply galley frame 42. Fast on rod 102 is a head 103, Fig. 12, extending laterally between the furcated end of a lever 104 pivoted to the frame at 105 and provided with a roller 106 riding upon a cam 107 on the shaft 64. Pushers 34 and 54 are also arranged to move in unison, and are adjustably secured to a head 108, Fig. 13, riding upon rod 102 and provided with a lateral extension projecting between the furcated end of a lever 109, the latter pivoted to the frame, as at 110, and carrying a roller 111 riding upon a cam 112 on shaft 64. Levers 104 and 109 are arranged to engage their cams on opposite sides of shaft 64 and said levers are connected by a spring 113 for maintaining them in yielding contact with their respective cams.

Gag block 33 is carried by a rod 114 supported in bearings on the frame and provided with an advancing spring 114$^\times$ and limiting stop 115. The outer end of said rod passes loosely through a bearing in head 101 and is provided with an adjustable collar 116. The gag block is retracted against the pressure of its spring 114$^\times$ by the engagement of head 101 with collar 116 when said head is retracted to withdraw pushers 35 and 40, and during the advance movement of head 101 the gag block is advanced by its spring until arrested by stop 115, said advance of the gag block into the path of the carrier taking place after the partial advance of the latter and before its return movement or the projection of the matrices beyond the guide and rotator, or in other words, before pushers 35 and 40 have displaced the engaged matrices into the paths of the jaws.

It will be observed that cams 107 and 112 operate upon levers 104 and 109 to positively retract the pusher carrying heads and that the advance of the pushers is effected by spring 113, hence if the advance of either pusher is prevented the lever controlling the same will be held back out of engagement with its cam.

Associated with each head 103, 108, is a latch in the form of a bell crank lever 118 or 118$^\times$ pivoted upon the frame and provided with a shoulder 119 or 119$^\times$ adapted to be entered into the path of its associated head when the latter is in retracted position, and to prevent the advance of said head and attached pushers under the action of their impelling spring until said latch is withdrawn. To insure the engagement of each latch before the depressed portion of the associated cam is reached, the latter is provided with a pin 120 or 120$^\times$ for engaging the tail of lever 118 or 118$^\times$ so as to move the engaging arm into contact with the associated head 103 or 108 with its shoulder 119 or 119$^\times$ in front of the head in the direction of the advance of the pushers coupled therewith. Each head 103, 108 is provided with a shoulder 121 or 121$^\times$ in position to engage an incline 122 or 122$^\times$ on the latch associated with the other head, the parts being so proportioned and arranged that the shoulder 121 of head 103 will engage and retract latch 118$^\times$ of head 108, and, in like manner, the shoulder 121$^\times$ of head 108 will engage and retract latch 118 of head 103 when the heads are near the end of the feeding movements. When not being acted upon by shoulders 121, 121$^\times$ or pins 120, 120$^\times$ the latches are retained in adjusted position by friction on their bearings. The engagement of the latches being positively effected through the action of pins 120, 120$^\times$, and their withdrawal, to permit the advance of the associated head 103, 108, being dependent upon the completion of the feeding or advance movements of said heads, it follows that if either head is prevented from making its complete feeding movement the other head succeeding it in action will not be released, but, on the contrary, will remain engaged by its latch, thereby positively suspending the action of the succeeding head and associated pushers. The purpose of this arrangement is to automatically suspend the action of the pushers in the event either member fails for any cause to complete its forward or feeding movement for the transfer of the matrix, so that if through mal-adjustment or the failure of any mechanism to perform its assigned function, as, for example, the failure of the jaws to open properly or to be brought into registry with the feeding channel, the rotator or the delivery channel, thereby preventing the pushers from effecting the required transfer of the matrices, no further transfers will be attempted until the defect has been remedied and thus injury to the machine and the contained matrices will be prevented.

Having thus described our invention, what we claim and desire to secure by Letters Patent of the United States, is:—

1. In a milling machine, the combination of the following elements, to wit:—spaced milling cutters; a reciprocating carrier provided with two clamping devices arranged in tandem; a rotator located to one side of the path traversed by said clamping devices, means for actuating the carrier and rotator including differential positioning device for causing the clamping devices to register with the rotator in alternation and to give the latter a partial turn in the interval between successive registrations; and means for transferring a contained blank from one clamping device to the rotator and from the latter to the other clamping device.

2. In a milling machine, the combination of the following elements, to wit:—spaced milling cutters; a reciprocatory carrier provided with a plurality of pairs of clamping jaws arranged in sequence and adapted to pass between said cutters; a rotator located to one side of the path traversed by said jaws and adapted to receive a blank from one pair of jaws, give it a partial turn and deliver the same to the other pair of jaws in the interval between successive passages of the jaws between the cutters; actuating devices for the carrier, including means for bringing the pairs of jaws alternately into register with the rotator; and means for transferring the contained blank from one pair of jaws to the rotator, and returning the same to the other pair of jaws.

3. In a milling machine, the combination of the following elements, to wit: a reciprocatory carrier provided with a plurality of blank holders arranged in tandem; a milling cutter; a rotator; and means for transferring a contained blank from one holder to the rotator, for giving the latter a partial turn, and for delivering the blank to the other holder.

4. In a milling machine, the combination of the following elements, to wit: a reciprocatory carrier equipped with a plurality of blank holders arranged in tandem; a milling cutter disposed to one side of the path of said holders; a rotator located to one side of the path of said holders; actuating devices for the rotator adapted to effect a partial turn of the latter at each reciprocation of the carrier; actuating devices for the carrier adapted to bring the blank holders into register with the rotator in alternation; and oppositely disposed pushers for transferring a contained blank from one holder to the rotator and for delivering said blank to the other holder.

5. The combination of the following elements to wit: a milling cutter; a reciprocating carrier provided with blank holders disposed in tandem; a rotator located to one side the path traversed by the holders and adapted to receive a contained blank from one holder, give it a partial turn and deliver it to the other holder; actuating devices for the carrier, including means for bringing alternate holders in register with the rotator; a blank feeder delivering to one holder when the companion holder is in register with the rotator, and means for transferring the contained blank from one holder to the rotator and delivering the same from the rotator to the other holder.

6. The combination of the following elements, to wit: opposed milling cutters; a carrier equipped with a plurality of blank holders arranged in tandem and adapted to traverse between the cutters; a rotator located to one side of the path traversed by said holders and adapted to receive a contained blank from one holder and after turning the same deliver it to another holder; means for conveying a partial rotation to the rotator in the interval between the presentation of successive holders; actuating devices for the carrier including differential positioning means for bringing successive holders in register with said rotator; and means for transferring a contained blank from one holder to the rotator and from the latter to a succeeding holder.

7. The combination of the following elements to wit: opposed milling cutters; a reciprocatory carrier equipped with a plurality of blank holders arranged in tandem; a rotator, a blank feeder and a blank receiver located at intervals to one side of the path of said holders; actuating devices for said carrier adapted to reciprocate the latter and during each complete movement to present one holder in register with the rotator and the other with the receiver and subsequently the first named holder with the feeder and the second holder with the rotator; means for giving the rotator a partial turn in the interval between the presentation of successive holders; and means for transferring contained blanks from the holders to the receiver and rotator, respectively, and from the rotator and feeder to the holders, respectively.

8. The combination of the following elements, to wit: opposed milling cutters; a reciprocating carrier provided with a plurality of blank holders disposed in tandem; a rotator; a blank feeder; a blank receiver; carrier actuating devices, including means for arresting the holders in register with the receiver and rotator, respectively, and in inverse relation with the rotator and feeder; means for transferring contained blanks from the holders to the receiver and rotator, and from the rotator and feeder to the holders; and actuating devices for automatically producing and controlling the movements of said carrier and blank transferring means.

9. An automatic milling machine including the following elements, in combination, to wit; opposed milling cutters; a reciprocatory carrier provided with a plurality of matrix holders arranged in tandem; matrix feeding devices, a rotator and matrix receiving devices arranged at intervals on one side of the path of said holders; means for reciprocating the carrier and alternately arresting the same with one holder in register with the matrix receiver and the other with the rotator, and subsequently with the first named holder in register with the rotator and the other with the feeder; means for effecting a transfer of the contained matrices from the holders to the receiver and rotator respectively, and from the rotator and feeder to the holders; means for rotating the rotator; and actuating devices connecting and controlling the movements of said operating elements.

10. The combination of the following elements, to wit; a reciprocatory carrier provided with a plurality of matrix or blank holders arranged in sequence; a rotator located to one side of the path of said holders; differential positioning means for successively presenting alternate holders in register with the rotator; and means for successively transferring a contained blank from a holder to the rotator and vice versa.

11. The combination of the following elements, to wit; a reciprocatory carrier provided with a plurality of holders arranged in tandem; a rotator adapted to receive a blank from one of the holders, partially rotate the same and deliver it to another of the holders; and means for gaging the position of the carrier, to present alternate holders in register with the rotator, the same including a fixed abutment, a movable gag block and a contacting member on the carrier.

12. The combination of the following elements, to wit; a reciprocatory carrier provided with a plurality of holders arranged in tandem; a rotator; and means for actuating the rotator and for bringing the holders alternately in register with said rotator, the same including yielding actuating devices for the carrier, a gaging member on the carrier in line with a fixed abutment, a movable gag block intermediate said abutment and gaging member, a pinion coupled with the rotator, a rack engaging the pinion, a motor for the rack and an engaging member on the carrier in line with said rack.

13. The combination of the following elements, to wit; spaced milling cutters, a carrier provided with a holder and movable to traverse a contained blank between said cutters; actuating devices including a positively driven member coupled with the carrier through yielding connections; and means for coupling the carrier and positively driven member while the blank is traversing in contact with the cutters.

14. The combination of the following elements, to wit; spaced milling cutters; a carrier provided with a blank holder arranged to conduct a contained blank between said cutters; and actuating devices for said carrier, including a driving member yieldingly coupled with the carrier to reciprocate the latter, a supplemental rigid connection located between said driving member and carrier, and means for automatically coupling up said rigid connection to control the rate of movement of the carrier when the blank is in engagement with the cutters.

15. The combination of the following elements, to wit; a milling mechanism; a reciprocating carrier provided with a blank holder for conducting a contained blank past the milling cutter; differential gaging means for the carrier; and actuating mechanism for the carrier including yielding transmitting connections and a supplementing rigid connection for positively controlling the advance of the carrier while the contained blank is passing the cutter.

16. The combination of the following elements, to wit; a milling device, a reciprocatory carrier provided with a holder for conducting a contained blank past the milling cutter; means for arresting the motion of the carrier at different points in its traverse; and actuating devices for the carrier the same including yielding driving connections, a supplemental rigid limiting connection, and means for automatically bringing said supplemental connection into action during the advance of the blank toward and its passage in contact with the milling devices, to resist the draw of the latter and restrain the advance of the blank.

17. The combination of the following elements, to wit; a milling mechanism; a reciprocatory blank carrier; differential carrier arresting devices; and an actuating mechanism including an oscillatory member, a yoke engaged by opposing cam surfaces, a reciprocatory transmitting member connected to the carrier and coupled with said oscillatory member through opposing yielding connections, a link connected with the carrier to reciprocate in unison therewith, and automatic means operating during the advance of the carrier toward the milling devices for coupling said link and oscillatory member or yoke.

18. The combination of the following elements, to wit; a reciprocatory carrier; opposed cams; a reciprocatory driving member deriving motion in opposite directions from said cams; a transmitting member coupled with the carrier; opposed yielding connections between said transmitting and reciprocatory members; and means for automatically coupling said driving member and the carrier during the movement of the latter in one direction, the same including a link coupled with the carrier and provided with a shoulder and an incline, the latter riding upon a support, said shoulder being adapted to engage the driving member and to be brought into engagement therewith, through the action of the incline upon its support, during the movement of the carrier in one direction, and to be withdrawn from such engagement during the motion of the carrier in the opposite direction.

19. The combination of the following elements, to wit; a milling mechanism; a reciprocatory carrier provided with a plurality of blank holders arranged in tandem and adapted to pass contained blanks between said cutters; a rotator located at one side of the path traversed by the holders; differential gaging or positioning means for the carrier; and actuating devices for said carrier, the same including opposed cams, a driving member engaged by said cams, and a transmitting member connected to the carrier and coupled with said driving member through oppositely yielding connections.

20. The combination of the following elements, to wit: a milling mechanism including cutters revolving in opposite directions and spaced to form a passage therebetween; a reciprocatory carrier provided with a plurality of blank holders arranged in tandem and adapted to pass contained blanks between said cutters; differential gaging or positioning means for arresting the carrier; actuating devices for the carrier including opposed cams, a driving member, a transmitting member coupled with the carrier, and opposed yielding connections between said driving and transmitting members; and means for coupling the carrier and said driving member during the passing of the blanks between the cutters to limit and restrain the rate of movement, the same including a link connection to the carrier and provided with deflecting means and an engaging shoulder, the latter adapted to be projected into the path of the driving members.

21. In a milling machine provided with a reciprocatory carrier and in combination therewith, an actuating mechanism including opposed cams, an oscillatory driving member, a pivoted transmitting member coupled with the carrier and provided with bearings on opposite sides of its axis, two levers mounted upon the driving member and each engaging one of said transmitting member bearings, a spring coupling said levers, and contact abutments on the driving member for said levers.

22. The combination with the reciprocatory carrier for a milling machine of differential arresting means and actuating devices including an oscillatory driving member, a transmitting member coupled with the carrier and provided with opposed bearings, two levers mounted upon the driving member and each engaging one of the transmitting member bearings, a spring connecting said levers and maintaining the latter in yielding contact with the transmitting member, a link coupled to move in unison with the carrier and provided with an engaging shoulder normally removed from the path of the driving member, and an incline engaging a bearing and operating during the advance of the link to project said shoulder into the path of the driving member.

23. The combination with a reciprocatory carrier for a milling machine, comprising a radius bar and a plurality of pairs of blank holding jaws arranged in tandem and each pair including a movable jaw and supporting lever, of actuating devices for said levers, the same including a wedging member supported longitudinally of the radius bar and interposed between said jaw carrying levers, and an actuating lever for said wedging member supported upon an axis transverse to that of the radius bar.

24. In a milling machine provided with a reciprocatory carrier comprising a radius bar and a plurality of pairs of clamping jaws arranged in tandem and each provided with a movable jaw and actuating lever, and in combination therewith, actuating devices for said levers the same including a member movable longitudinally of the radius bar and provided with inclines engaging the jaw levers, a bell crank lever supported upon an axis transverse to that of the radius bar, and a rod extending through the axis of the radius bar and engaging said bell crank lever.

25. In a milling machine provided with a reciprocatory blank carrier and a plurality of pushers and in combination therewith, actuating devices for said pushers, the same including two oppositely movable heads each coupled with one of said pushers, a spring advanced and cam retracted member for each pusher head, and two latches, one for each pusher head and adapted to engage and arrest the motion of the latter when in retracted position, and means whereby upon the completion of the forward or feeding movement of either pusher, but not otherwise, the latch of the companion pusher will be retracted to permit the subsequent advance of said companion pusher.

26. In a milling machine provided with a plurality of blank transferring devices or pushers arranged for consecutive action and in combination therewith, an actuating and safety cut-out mechanism including the following elements, to wit: oppositely movable heads each coupled with one of the pushers, spring actuated members engaging said heads to advance the latter in relatively opposite directions, means for retracting said head engaging members, and a retaining latch for each pusher head, said latches being so constructed and arranged that each will be engaged and withdrawn to permit the advance of its pusher head by the engagement of the opposite head when in an extreme advanced position.

27. In a milling machine equipped with consecutively acting pushers and in combination therewith, oppositely movable heads, each coupled with a pusher, two spring actuated levers each coupled with one of said heads, retracting cams for said levers, two latches one for each head and arranged to be engaged and withdrawn by the opposite head when the latter is in its advanced position, and means coupled with the cams and acting upon the latches to advance each into locking position with relation to the pusher head prior to the advance of the latter.

28. In a milling machine the combination of the following elements, to wit: a milling mechanism; a reciprocatory carrier provided with a plurality of blank holders arranged in tandem; a blank feeder, a rotator and a blank receiver arranged in sequence by the side of the path of the holders; means for positioning the carrier with its holder in register with the blank receiver and rotator and with the latter and the blank feeder in alternation; pushers, each in alinement with one of the blank holders when the latter are in register with the blank receiver and rotator; pushers connected for simultaneous movement, the one discharging from the feeder and the other from the rotator; and actuating devices for said two sets of pushers provided with means for automatically locking out or preventing the advance of either set of pushers until after the other set has completed its transfer movement.

29. In a milling mechanism, the combination of the following elements, to wit: a reciprocatory carrier provided with clamping jaws; a rotator; means for arresting the carrier with its jaws in register with the rotator; means for discharging a blank from the rotator; and a gaging member against which the discharged blank contacts to determine its longitudinal position with relation to the clamping jaws of the carrier.

30. In a milling machine, the combination of the following elements, to wit: a reciprocatory carrier provided with blank holding jaws; a rotator located on one side of the path of said jaws; means for positioning the carrier with its jaws in register with the rotator; a gaging member opposite the rotator; a pusher of less sectional area than the blank passing through said gaging surface; and an opposing pusher within the rotator.

31. In a milling machine provided with a reciprocatory blank carrier, a rotator, a receiving channel and a pusher for transferring blanks from the carrier into and through said receiving channel, and in combination therewith, a transverse channel at a lower level than the receiving channel, a removable galley forming a continuation of said transverse channel, and a pusher for transferring a blank from the transverse channel into said galley.

32. In a milling machine provided with a reciprocatory carrier equipped with blank retaining jaws, a rotator disposed at one side of the path of said jaws, and blank transferring devices, and in combination therewith, a pinion coupled with the rotator, a rack engaging said pinion and in turn engaged by the carrier, a motor spring acting on the rack in opposition to the carrier, a receiving channel into which the blanks are discharged from the jaws, and a pusher traversing the receiving channel and coupled with the rotator rack to move in unison therewith, but in a reverse direction.

33. In a milling machine provided with a reciprocatory carrier equipped with a plurality of blank holders disposed in tandem, a rotator located to one side of the path of said holders, means for arresting the carrier with one holder in register with the rotator and another in register with a discharge passage, blank transferring devices for discharging both holders, and a rotator discharging pusher, and in combination therewith, a receiving galley, a pusher therefor, and means for actuating said last named pusher and the rotator, the same including a rack coupled with the rotator and pusher, a motor spring for said rack, and means coupled with the carrier and engaging the rack to move the latter in opposition to its motor.

JOHN SELLERS BANCROFT.
MAURITZ C. INDAHL.

Witnesses:
MORTIMER A. JONES,
FRED WEINDEL, Jr.

Copies of this patent may be obtained for five cents each, by addressing the "Commissioner of Patents, Washington, D. C."